(12) United States Patent
Allen

(10) Patent No.: US 9,613,603 B2
(45) Date of Patent: Apr. 4, 2017

(54) MUSICAL PERCUSSION DRUM MOUNTING CLAMP AND RELATED SYSTEM

(71) Applicant: Conn-Selmer, Inc., Elkhart, IN (US)

(72) Inventor: Joshua Allen, Portage, MI (US)

(73) Assignee: Conn-Selmer, Inc., Elkhart, IN (US)

( * ) Notice: Subject to any disclaimer, the term of this patent is extended or adjusted under 35 U.S.C. 154(b) by 284 days.

(21) Appl. No.: 14/355,092

(22) PCT Filed: Dec. 12, 2012

(86) PCT No.: PCT/US2012/069217
§ 371 (c)(1),
(2) Date: Apr. 29, 2014

(87) PCT Pub. No.: WO2013/101464
PCT Pub. Date: Jul. 4, 2013

(65) Prior Publication Data
US 2014/0305282 A1    Oct. 16, 2014

Related U.S. Application Data

(60) Provisional application No. 61/581,212, filed on Dec. 29, 2011.

(51) Int. Cl.
*F16B 2/06* (2006.01)
*G10D 13/02* (2006.01)
(52) U.S. Cl.
CPC ............. *G10D 13/026* (2013.01); *F16B 2/06* (2013.01); *Y10T 403/45* (2015.01); *Y10T 403/7062* (2015.01)

(58) Field of Classification Search
CPC .... G10D 13/026; G10D 13/00; G10D 13/027; G10D 13/028; G10G 5/00; F16B 21/09
USPC ................................................ 84/411 R, 421
See application file for complete search history.

(56) References Cited

U.S. PATENT DOCUMENTS

| 5,046,700 A | 9/1991 | Hoshino |
| 5,684,258 A | 11/1997 | Liao |
| 7,906,718 B1 | 3/2011 | Liao |

(Continued)

FOREIGN PATENT DOCUMENTS

JP    3004275    8/1994

OTHER PUBLICATIONS

European Search Report; EP 12863095.1; Ex. T. Vollmer; Jan. 21, 2016; 4 pp.

(Continued)

*Primary Examiner* — Kimberly Lockett
(74) *Attorney, Agent, or Firm* — Fish & Richardson P.C.

(57) ABSTRACT

In some aspects, a musical percussion instrument includes a musical drum having a generally cylindrical musical drum body and a sound generating surface secured to an upper end of the drum body by multiple drum lugs and a drum mounting clamp mounted to one drum lug of the multiple drum lugs for releasable mounting of a mounting rod to the drum body. The drum mounting clamp includes a mounting base for mounting upon the musical drum body. The mounting base has a mounting rod recess and a securement element to secure the drum clamp to a mounting rod, arranging the musical drum body relative to the mounting rod.

21 Claims, 15 Drawing Sheets

(56) References Cited

U.S. PATENT DOCUMENTS

| | | | |
|---|---|---|---|
| 8,431,808 B2* | 4/2013 | Nakata | G10D 13/026 84/421 |
| 2011/0030531 A1 | 2/2011 | Nakata et al. | |
| 2011/0265632 A1 | 11/2011 | Harrison et al. | |

OTHER PUBLICATIONS

International Search Report; PCT/US2012/069217; Feb. 20, 2013; 2 pp.
Written Opinion; PCT/US2012/069217; Feb. 20, 2013; 5 pp.

* cited by examiner

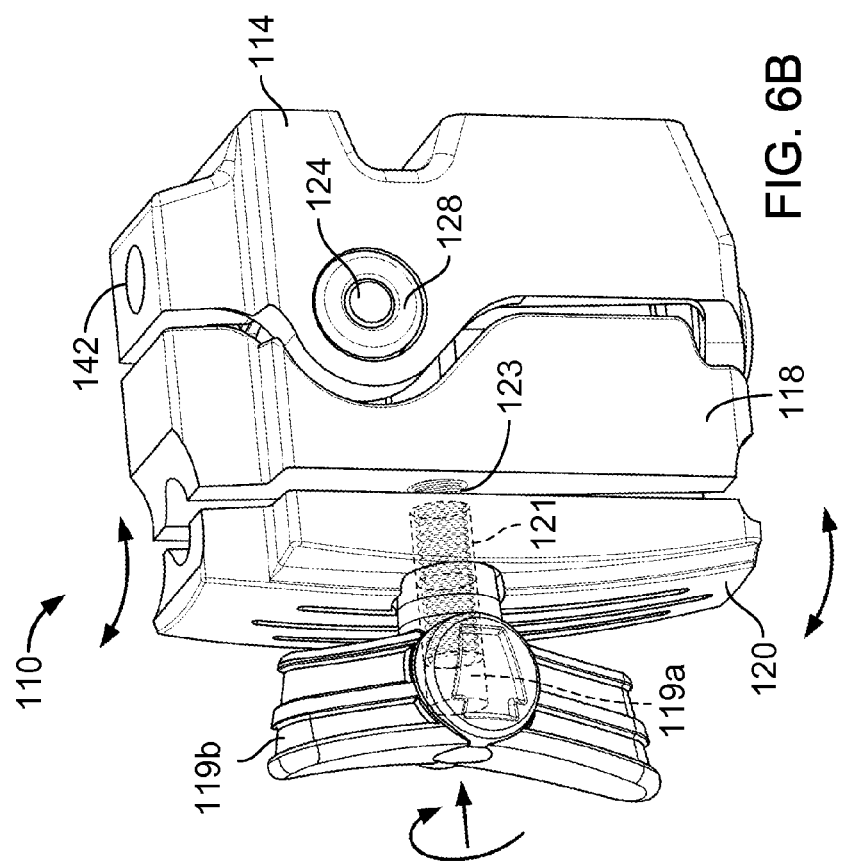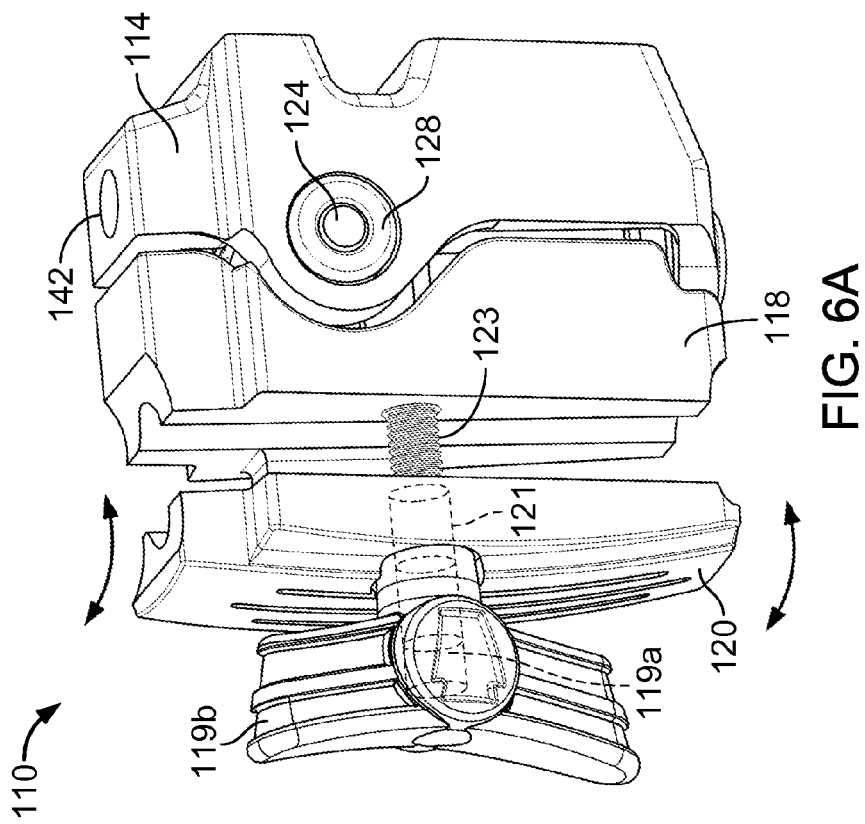

MUSICAL PERCUSSION DRUM MOUNTING CLAMP AND RELATED SYSTEM

CROSS-REFERENCE TO RELATED APPLICATIONS

This application is a U.S. National Phase Application of International Patent Application No. PCT/US2012/069217 filed Dec. 12, 2012, which claims the benefit of U.S. Provisional Patent Application No. 61/581,212, filed Dec. 29, 2011, the contents of both of which are incorporated by reference herein in their entirety.

TECHNICAL FIELD

This invention relates to musical percussion drum mounting clamps, and to related systems.

BACKGROUND

Certain musical percussion arrangements (e.g., drum sets) include various pieces of percussion equipment (e.g., drums or cymbals) that are arranged and mounted as part of the set (e.g., to floor stands or to other drums). The various pieces of percussion equipment included in a drum set can typically be arranged in a wide variety of different, e.g. custom, combinations and spatial orientations, often in accordance with personal preferences of the individual percussionist. In some cases, some drums are supported by floor stands while others are mounted to adjacent drums. Percussion accessories can also be mounted to drums of the drum set so that a musician can access the percussion accessories during play without requiring additional, separate percussion accessory support stands. Some articles of percussion equipment may be assembled (e.g., mounted to a drum) each time the drum set is set up for use and disassembled (e.g., removed from the drum) when the drum set is broken down for storage or transportation.

SUMMARY

In the setup and assembly of certain musical percussion instruments (e.g., drum sets), a musician can arrange many different pieces of percussion equipment, such as drums (e.g., bass drums, floor toms, or tom toms) cymbals (e.g., crash cymbals or ride cymbals), and other types of percussion equipment, e.g. percussion accessories (e.g., cowbells, tambourines, woodblocks, or chimes) relative to one another. When arranging and mounting the various pieces of percussion equipment, it is often desirable to mount different pieces of equipment (e.g., to support stands or to one another) using one or more drum clamps. A drum clamp of this disclosure can be installed in place of a drum lug, thereby permitting various pieces of percussion equipment to accommodate a drum clamp without significantly modifying the drum (e.g., by cutting or machining portions of the drum). It may also be desirable to isolate the pieces of percussion equipment secured by the drum clamp from vibration of the drum using a vibration isolation member arranged between the drum clamp and the drum body.

In one aspect of the disclosure, a musical percussion instrument includes a musical drum having a generally cylindrical musical drum body and a sound generating surface secured to an upper end of the drum body by multiple drum lugs, and a drum mounting clamp mounted to one drum lug of the multiple drum lugs for releasable mounting of a mounting rod to the drum body. The drum mounting clamp includes a mounting base mounted upon the drum body and a mounting clamp mounted upon the mounting base. The mounting clamp includes a clamp base and a clamp element, the clamp base and clamp element being reversibly adjustable between a first, spaced position for receiving the mounting rod and a second, clamping position for securely grasping the mounting rod.

Implementations can include one or more of the following features. A vibration isolation member disposed generally between and joining the mounting base and the mounting clamp, and placing the mounting clamp in vibration isolation from the drum body. The vibration isolating member includes rubber. The mounting base defines a first pin member disposed in a first plane and engaged in the vibration isolation member, the first plane being generally horizontal relative to the musical drum axis, and the clamp base defines a second pin member disposed in a second plane lying generally perpendicular to the first plane and engaged in the vibration isolation member, the second plane being generally vertical relative to the musical drum axis. The vibration isolation member includes a pair of first washer elements formed of a resilient, vibration dampening material received about the first pin member, and a second washer element formed of the resilient, vibration-dampening material received about the second pin member. Each of the washer elements of the first pair of washer elements is disposed in opposing first recesses defined by the mounting base, and the second washer element is disposed in a second recess defined by the mounting base. The second washer element is disposed at a generally lower end of the drum clamp relative to the sound generating surface of the drum than the pair of first washer elements. The first pin member extends through the first washer elements. Securement elements (e.g., threaded fasteners) secure the first and second pin members relative to the clamp base. One or more mounting members secure the mounting base to the drum body in a drum lug position. The mounting members are threaded fasteners engaged in a drum lug receptacle of the drum body. In some implementations, the musical percussion instrument includes a memory locking device to be fastened to the mounting rod, the memory locking device defining an outer surface that is shaped and arranged to be received by a mating surface of the drum mounting clamp when the drum clamp and the memory locking device are secured to the mounting rod and abutted to one another.

In another aspect of the disclosure, a drum mounting clamp for releasable mounting of a mounting rod to a musical drum body in a position provided for mounting a drum lug includes a mounting base for mounting upon the musical drum body and a mounting clamp mounted upon the mounting base. The mounting clamp includes a clamp base and a clamp element, the clamp base and clamp element being reversibly adjustable between a first, spaced position for receiving the mounting rod and a second, clamping position for securely grasping the mounting rod.

Implementations can include one or more of the following features. A vibration isolation member disposed generally between and joining the mounting base and the mounting clamp, and placing the mounting clamp in vibration isolation from the drum body. The vibration isolating member includes rubber. The mounting base defines a first pin member disposed in a first plane and engaged in the vibration isolation member, and the clamp base defines a second pin member disposed in a second plane lying generally perpendicular to the first plane and engaged in the vibration isolation member. The vibration isolation member includes a pair of first washer elements formed of a resilient, vibration dampening material received about the first pin member, and a second washer element formed of the resilient, vibration-dampening material received about the second pin member. Each of the washer elements of the first pair of washer elements is disposed in opposing first recesses defined by the mounting base, and the second washer element is disposed in a second recess defined by the mounting base. The second washer element is disposed relatively closer to a first end of the drum clamp than the pair of first washer elements. The first pin member extends through the first washer elements. In some implementations, securement elements (e.g., threaded fasteners) secure the first and second pin members relative to the clamp base.

In another aspect of the disclosure, a drum mounting clamp for releasable mounting of a mounting rod to a musical drum body in a position provided for mounting a drum lug includes a mounting base for mounting upon the musical drum body, the mounting base defining a mounting rod recess, and a securement element to secure the drum clamp to a mounting rod, arranging the musical drum body relative to the mounting rod.

Implementations of the disclosure can have one or more of the following advantages. For example, in some implementations, a drum clamp as described herein can mount a drum to a percussion stand or to another drum using mounting rods secured in the drum clamp, or alternatively to mount percussion accessories to a drum, in better vibration isolation from the drum, e.g., as compared to certain conventional drum clamps, by securing a mounting clamp to a mounting base of the drum clamp with a vibration isolation member. Also, the drum clamps described herein can be secured to a drum in a simpler and less intrusive manner, e.g., as compared to certain conventional drum clamps, by replacing an existing drum lug of a drum and coupling a mounting clamp to a drum along both vertical and horizontal axes relative to the drum.

The details of one or more implementations of the disclosure are set forth in the accompanying drawings and the description below. Other aspects, features, and advantages of the disclosure will be apparent from the description and drawings, and from the claims.

DESCRIPTION OF DRAWINGS

FIGS. 6A and 6B illustrate adjustment of a drum mounting clamp of FIG. 1 between a first, open position and a second, closed position.

DETAILED DESCRIPTION

Figure 1:
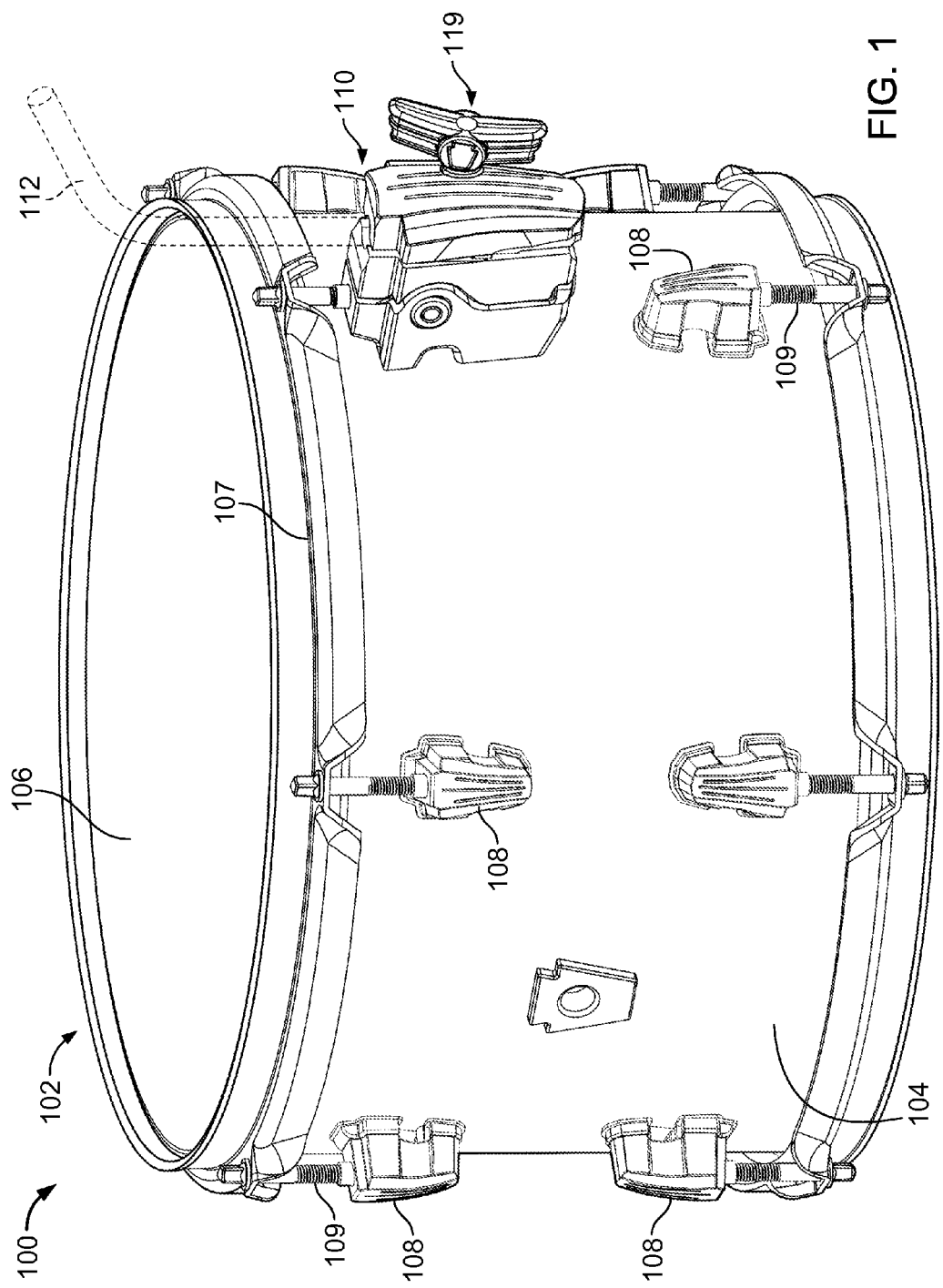
FIG. 1 is a perspective view of a musical percussion drum having a drum mounting clamp of this disclosure.
Figure 2A:
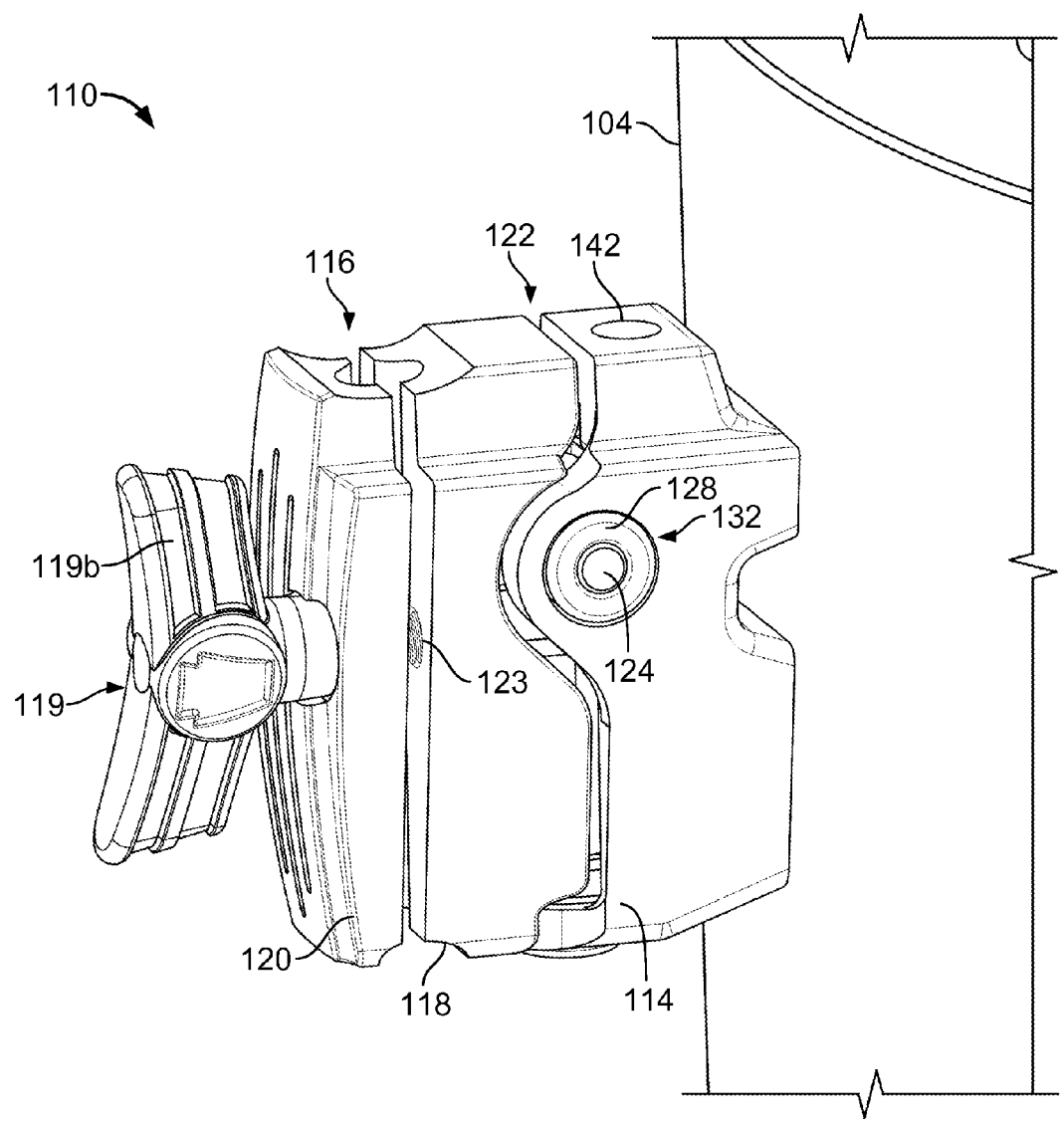
FIGS. 2A and 2B are an enlarged perspective view and an exploded perspective view of the drum mounting clamp of FIG. 1.
Figure 2B:
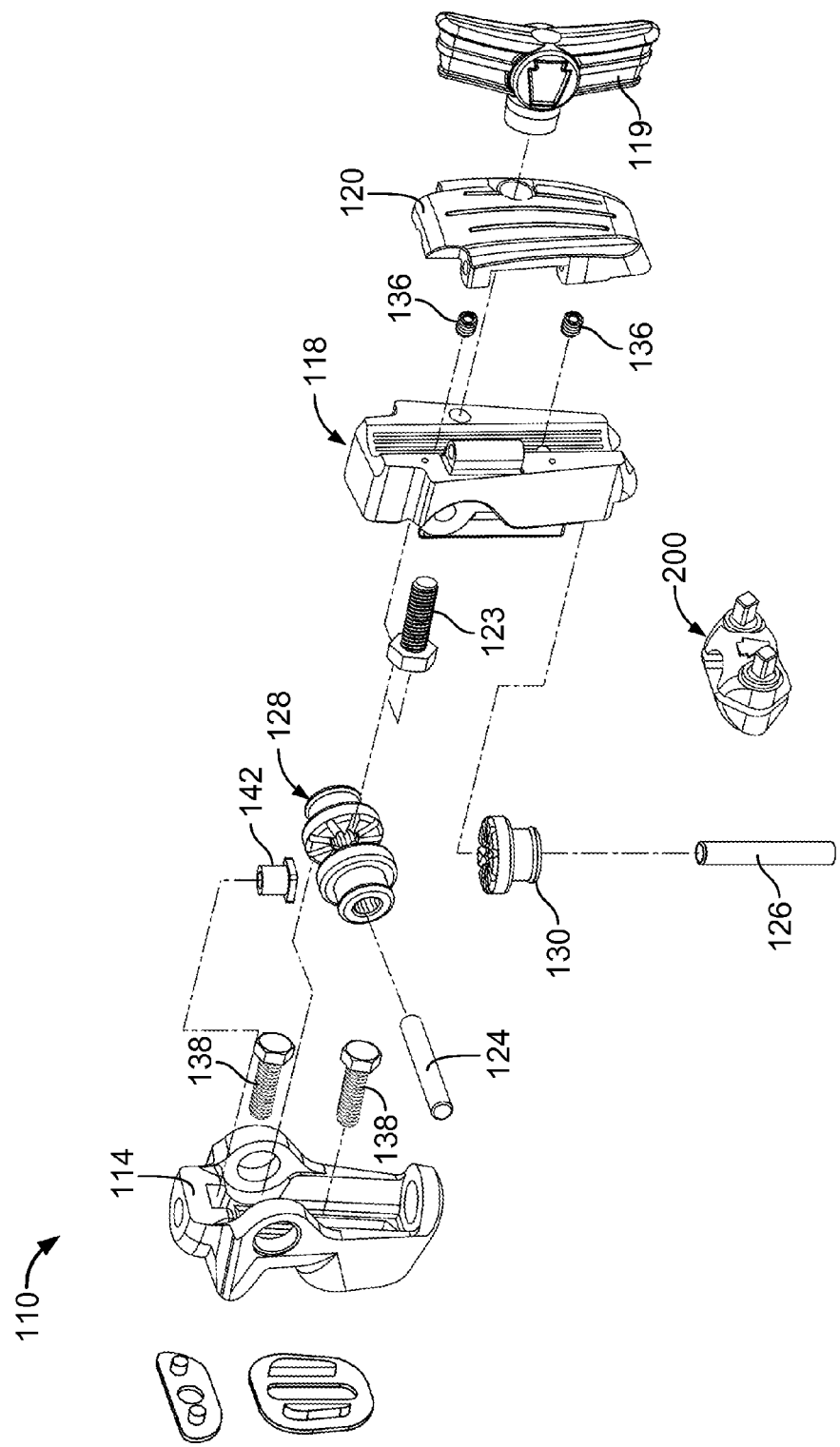
Figure 3:
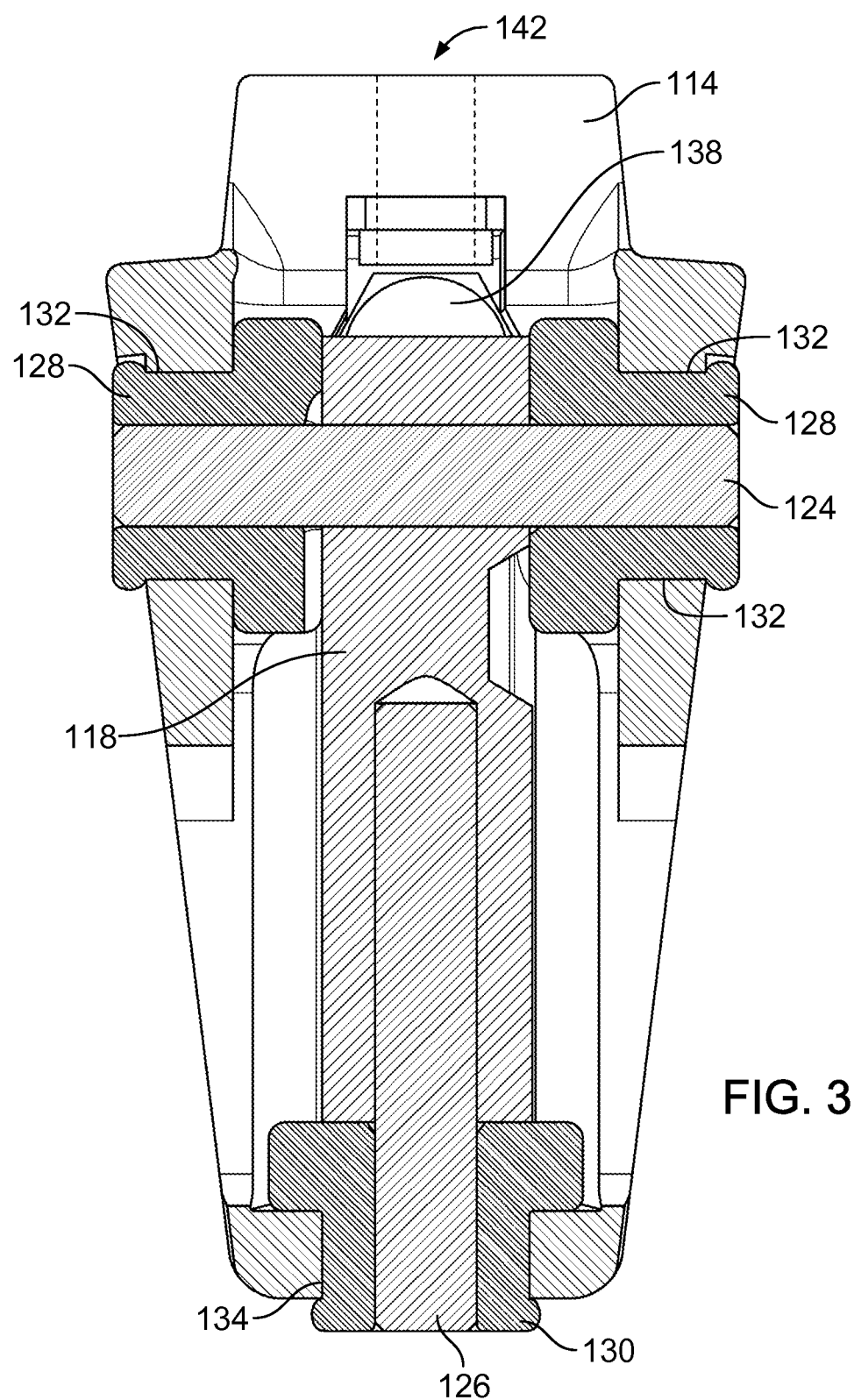
FIG. 3 is a cross-sectional front view of the drum mounting clamp of FIG. 1.

Referring to FIG. 1, in one implementation, a musical percussion instrument 100 includes a musical drum 102 having a generally cylindrical drum body 104 and a sound generating surface (e.g., a drum head) 106 secured to an upper end of the drum body 104, and a drum mounting clamp 110. The drum mounting clamp 110 permits a drummer to releasably mount and dismount a mounting rod (e.g., a drum or cymbal mounting rod) 112 to the drum body 104, including between sets, or even during play, and without the clutter of multiple different accessory stands.

Referring also to FIGS. 1-5, the drum 102 includes a drum ring 107 that secures the drum head 106 to the drum body 104. Tension is applied to the drum ring 107 and drum head 106 using multiple tension rods 109 received (e.g., via a threaded connection) in drum lugs 108 secured (e.g., fastened using threaded fasteners) around the circumference of the drum body 104. The tension rods 109 can be sequentially rotated relative to the drum lugs 108 to adjust the tension of the drum head 106 relative to the drum body 104.

The drum mounting clamp 110 has a mounting base 114 for mounting the drum mounting clamp 110 to the drum body 104, and a mounting clamp member 116 secured to the mounting base 114. The mounting clamp member 116 has a clamp base 118 and a cooperating clamp element 120.

A clamp retention member (e.g., a clamp lever or wing nut) 119 secures the clamp element 120 relative to the clamp base 118. The clamp retention member 119 includes a fastener (e.g., threaded recess) portion 119a formed in a handling (e.g., lever) portion 119b. Referring to FIG. 6A, the clamp retention member fastener portion 119a engages (e.g., by a threaded connection) with a clamp fastener (e.g., a threaded fastener) 123 that extends from the clamp base 118. The clamp fastener 123 is accommodated by a clamp retention member recess 121 formed in the clamp element 120 so that the clamp element 120 can move relative to the clamp fastener 123. When the clamp element 120 is in the second, clamping position relative to the clamp base 118, the fastener portion 119a engages the clamp fastener 123 of the clamp base 118 securing the clamp element 120 to the clamp base 118. The clamp element 120 is moved toward the clamp base 118 and secured in the second, clamping position by tightening the threaded connection between the fastener portion 119a and the clamp fastener 123. The clamp retention member 119 also provides clamping force (e.g., by tightening the threaded connection) to grasp the mounting rod 112 within the mounting clamp 116. For securely grasping the mounting rod 112, in the second, clamping position, the clamp base 118 and the clamp element 120 define a recess having a diameter that is about 0.375 inch (9.5 mm) to about 0.5 inch (12.7 mm).

In the implementation shown, a vibration isolation member 122 is arranged between and joins the mounting clamp member 116 to the mounting base 114. The vibration isolation member 122 places the mounting clamp member 116 in vibration isolation from the drum body 104 so that vibrations in the drum 102 (e.g., from striking the drum) are not substantially transferred to the mounting rod 112 and subsequently on to the jointly mounted drums or percussion accessories. The vibration isolation member 122 can include an element of a vibration isolating material (e.g., polyurethane, rubber, or elastomer) disposed between the mounting base 114 and the mounting clamp element 116.

Referring to FIGS. 2A, 2B, 3, 4, and 5, in some implementations, a first pin member 124 is disposed in a first plane (e.g., generally horizontal to a drum axis, A) and engages in a portion of the vibration isolation member 122 disposed in the mounting base 114. The first pin member 124 also passes through a first pin recess formed in the clamp base 118, coupling the mounting clamp member 116 to the mounting base 114 and restricting the mounting clamp member 116 from moving vertically relative to the mounting base 114. Similarly, a second pin member 126 disposed in a second plane (e.g., generally vertical to the drum axis, A) lying generally perpendicular to the first plane and engaged in a portion of the vibration isolation member 122 disposed in the mounting base 114. The second pin member 126 also passes through a second pin recess formed in the clamp base 118, coupling the mounting clamp member 116 to the mounting base 114 and restricting the mounting clamp 116 from moving in a horizontal direction relative to the mounting base 114. The multiple (e.g., two) pin members 124, 126 arranged substantially perpendicular to another couple the mounting clamp member 116 to the mounting base 114 about both the vertical and horizontal axes. Typically, the first and second pin members 124, 126 are generally cylindrical and sized to support the weight of the mounting clamp member 116 and any percussion accessories 112 engaged in the drum mounting clamp 110.

As the implementation shown, the vibration isolation member 122 includes a pair of first washer elements 128 formed of a resilient, vibration-dampening material received about the first pin member 124 and a second washer element 130 formed of the resilient, vibration-dampening material received about the second pin member 126. The first pin member 124 is coupled to the mounting base 114 by engagement of each first washer elements 128 in a first recesses 132 of the mounting base 114. In some implementations, the first pin 124 extends through the first washer elements 128. The second pin member 126 is coupled to the mounting base 114 by engagement of the second washer element 130 in a second recess 134 of the mounting base 114. The second recess 134 is typically arranged closer to a first end (e.g., a lower end) of the drum mounting clamp 110 than the pair of first washer elements 128.

Figure 4:
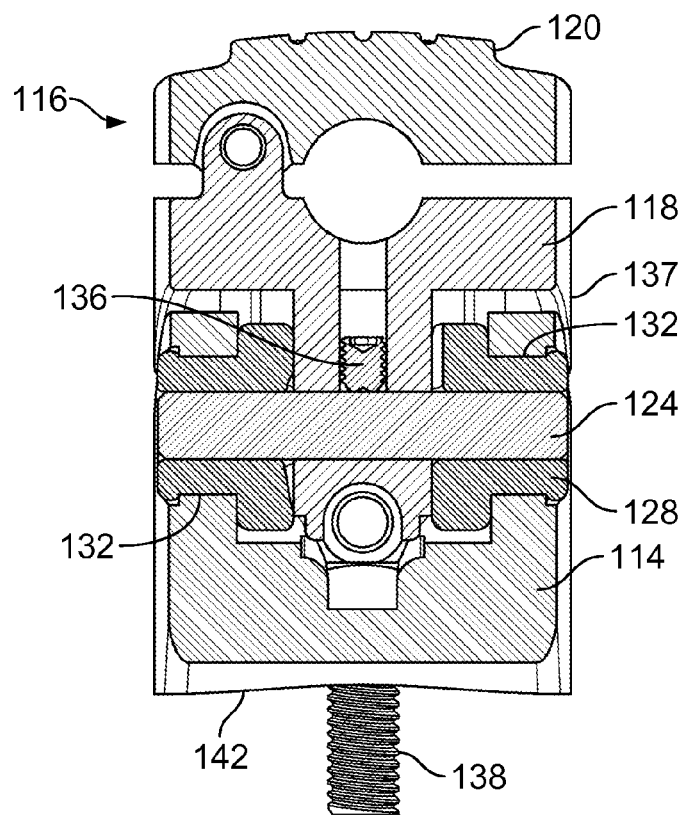
FIG. 4 is a cross sectional top view of the drum mounting clamp of FIG. 1.
Figure 5:
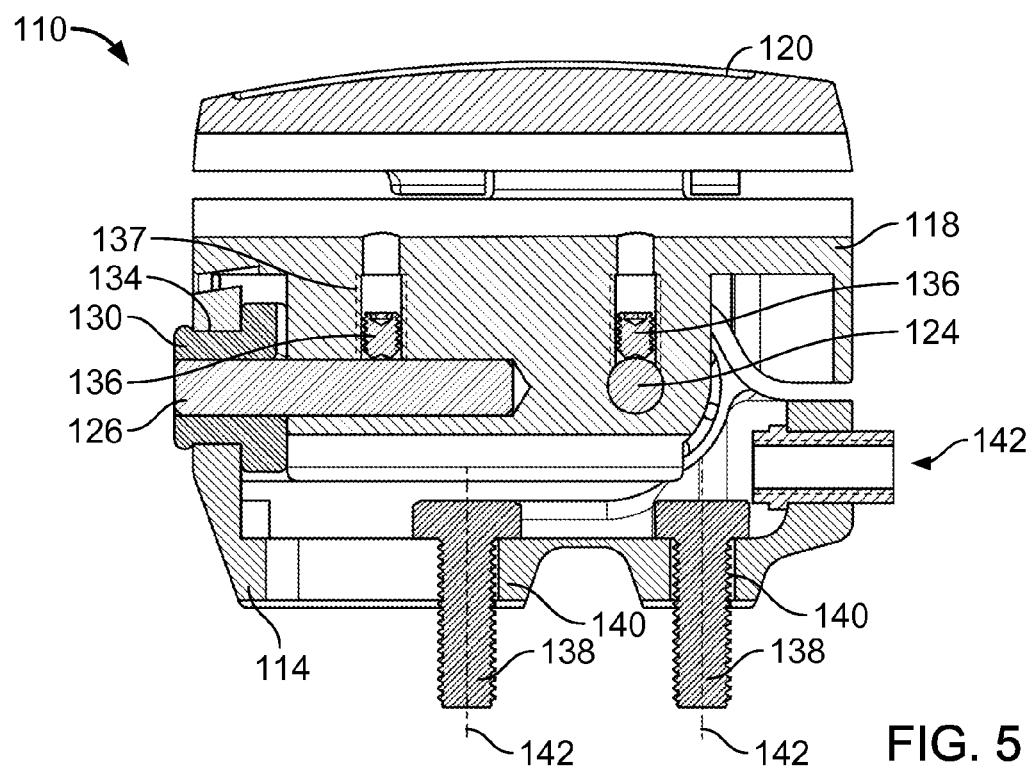
FIG. 5 is a cross-sectional side view of the drum mounting clamp of FIG. 1.

Referring to FIGS. 4 and 5, the drum mounting clamp 110 includes securement elements 136 securing the first and second pin members 124, 126 in place relative to the clamp base 118, thereby securing the mounting clamp member 116 substantially in place relative to the mounting base 114. In some implementations, the securement elements 136 are fasteners (e.g., threaded fasteners) received in threaded recesses 137 defined by the clamp base 114.

The drum clamp 110 includes multiple (e.g., two) mounting members 138 securing the drum clamp 110 to the drum body 104. The mounting members 138 are typically fasteners (e.g., threaded fasteners) sized to be received in receptacles (e.g., fastener receptacles) arranged around the drum body 104. Typically, the drum mounting clamp 110 is mounted in place of one of the drum lugs 108 of the drum 102. Therefore, the mounting base 114 has multiple mounting member recesses 140 sized to accommodate the mounting members 138. Typically, the mounting member recesses 140 have diameter of about 0.1875 inch (4.8 mm) to about 0.375 inch (9.5 mm) and central axes 142 of the recesses 140 are separated by a distance that is about 0.75 inch (19.1 mm) to about 2 inches (50.8 mm) to accommodate mounting members 138 that are threaded fasteners (e.g., M6 style fasteners) so that the drum mounting clamp 110 can be fastened to the drum body 104 to replace at least one conventional drum lug. In some implementations, one or more of the mounting member recesses are formed as slotted recesses to accommodate drum bodies having different bolt pattern configurations.

The mounting base 114 is constructed to act in place of the removed drug lug 108, and includes a tension rod receptacle 142 sized and configured to receive one of the tension rods 109 when the drum mounting clamp 110 is mounted to replace a drum lug 108 (shown in FIG. 1). To secure the drum head 106 to the drum body 104, a drum mounting clamp 110 is fastened to the drum body 104 in place of a drum lug 108, and tension is applied to the drum ring 107 using tension rods 109.

The configuration of the mounting members 138 and the tension rod receptacle 142 allow the drum mounting clamp 110 can be secured to the drum body 104 in place of a single drum lug 108, making the installation of drums to other pieces of equipment (e.g., another drum or a stand), or, alternatively, the installation of percussion accessories to drums, using mounting rods 112 simpler and faster for a user.

A number of implementations have been described.

It will be understood that various modifications may be made without departing from the spirit and scope of the disclosure. Accordingly, other embodiments are within the scope of the following claims. For example, the mounting base 114, the clamp base 118, the clamp element 120, the clamp retention member 119, and the first and second pin members 124, 126 can each be made of any of various suitable materials (e.g., plastic, composite, or metal). The resilient, vibration-dampening material can be made from any of various structurally suitable materials that provide adequate vibration-dampening (e.g., rubber, elastomer, or urethane). While the drum mounting clamp 110 has been described as being attached to the drum body 104 using separate mounting members 138, other techniques are possible. For example, in some implementations, the mounting members are integrally formed as features of the mounting base or the clamp base.

Figure 7:
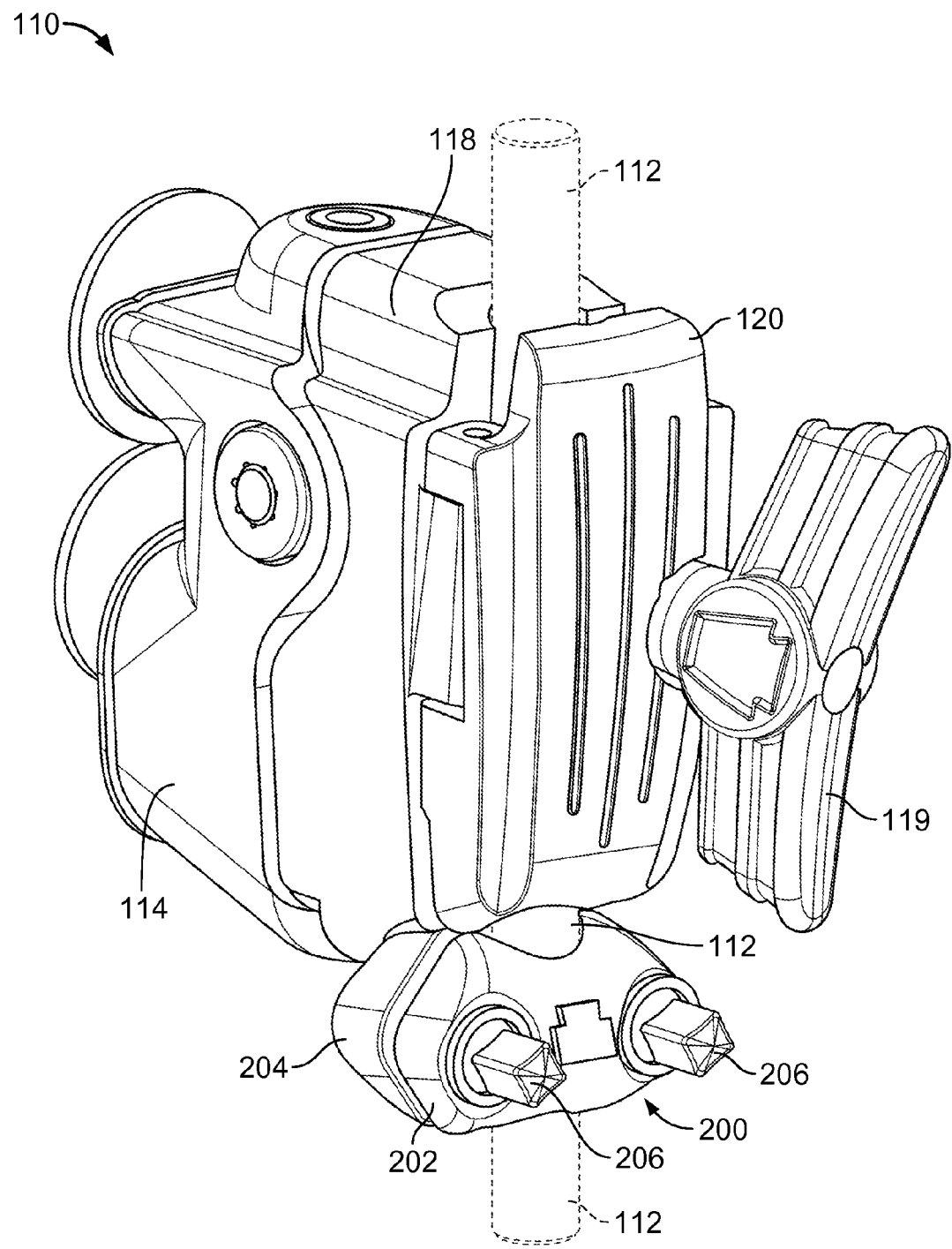
FIG. 7 is a perspective view of the drum mounting clamp of FIG. 1 secured to a mounting rod and abutting a memory lock that is also secured to the mounting rod.

Referring to FIG. 7, a memory lock element 200 can be fastened onto the mounting rod 112 to preserve a desired mounting location of the drum mounting clamp 110 along the mounting rod 112. The memory lock element 200 includes a first clamping element 202 and a second clamping element 204 that are fastened to one another by securement elements (e.g., threaded fasteners) 206 to grasp the mounting rod 112. The first and second clamping elements 202, 204 have curved upper and lower surfaces that are shaped to mate with corresponding upper and lower surfaces of the drum mounting clamp 110. Typically, a user will determine a desired arrangement of one drum relative to another drum. Once in place, the user can abut the memory lock 200 against the drum mounting clamp 110 and secure the memory lock 200 to the mounting rod 112. Securing the memory lock 200 in place on the mounting rod 112 permits the user to dismount the drum and drum mounting clamp 110 from the mounting rod 112 without losing the desired position and arrangement.

Figure 10:
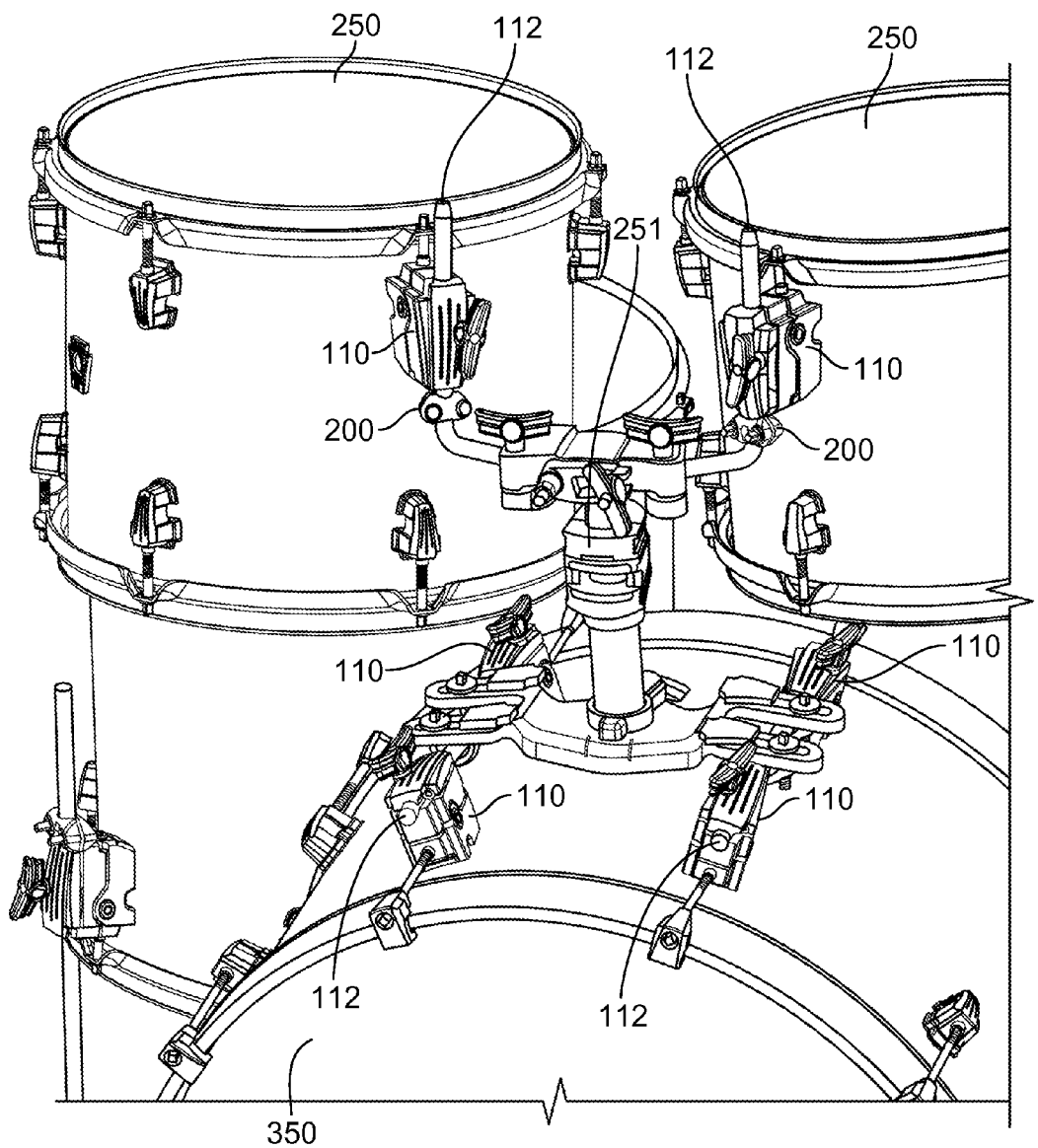

FIGS. 9-13 illustrate exemplary uses for the drum mounting clamp 110. For example, referring to FIG. 9, the drum mounting clamp 110 can mount various components of a drum set to one another. FIG. 10 illustrates the drum mounting clamps 110 mounting two tom toms 250 to a bass drum 350. As shown, several mounting rods 112 are fastened to a dual tom tom mount 251. Multiple drum mounting clamps 110 mounted in place of drum lugs are secured to the tom toms 250 and the bass drum 350 and grasp the mounting rods 112 to position the tom toms 250 at a desired location relative to the bass drum 250. Memory locks 200 preserve the position and orientation of the tom toms 250 when they are dismounted from the mounting rods.

Figure 11:
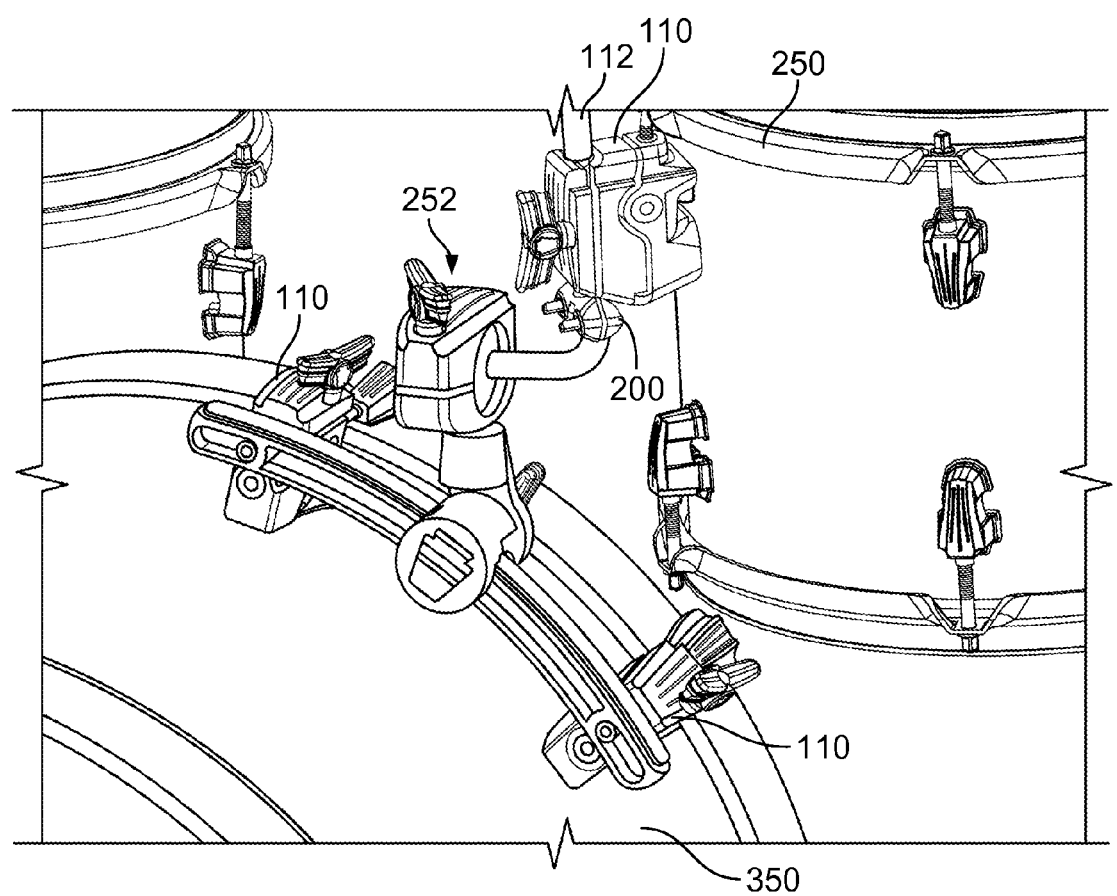

Referring to FIG. 11, a single tom tom mount 252 can be secured to the bass drum 350 for securing a single tom tom 250 to the bass drum 350. As shown, multiple drum mounting clamps 110 mounted in place of drum lugs on both the bass drum 350 and the tom tom 250 are used to mount the single tom tom mount 252 to the bass drum 350 and grasp a mounting rod 112 extending from the single tom tom mount 250.

Figure 12:
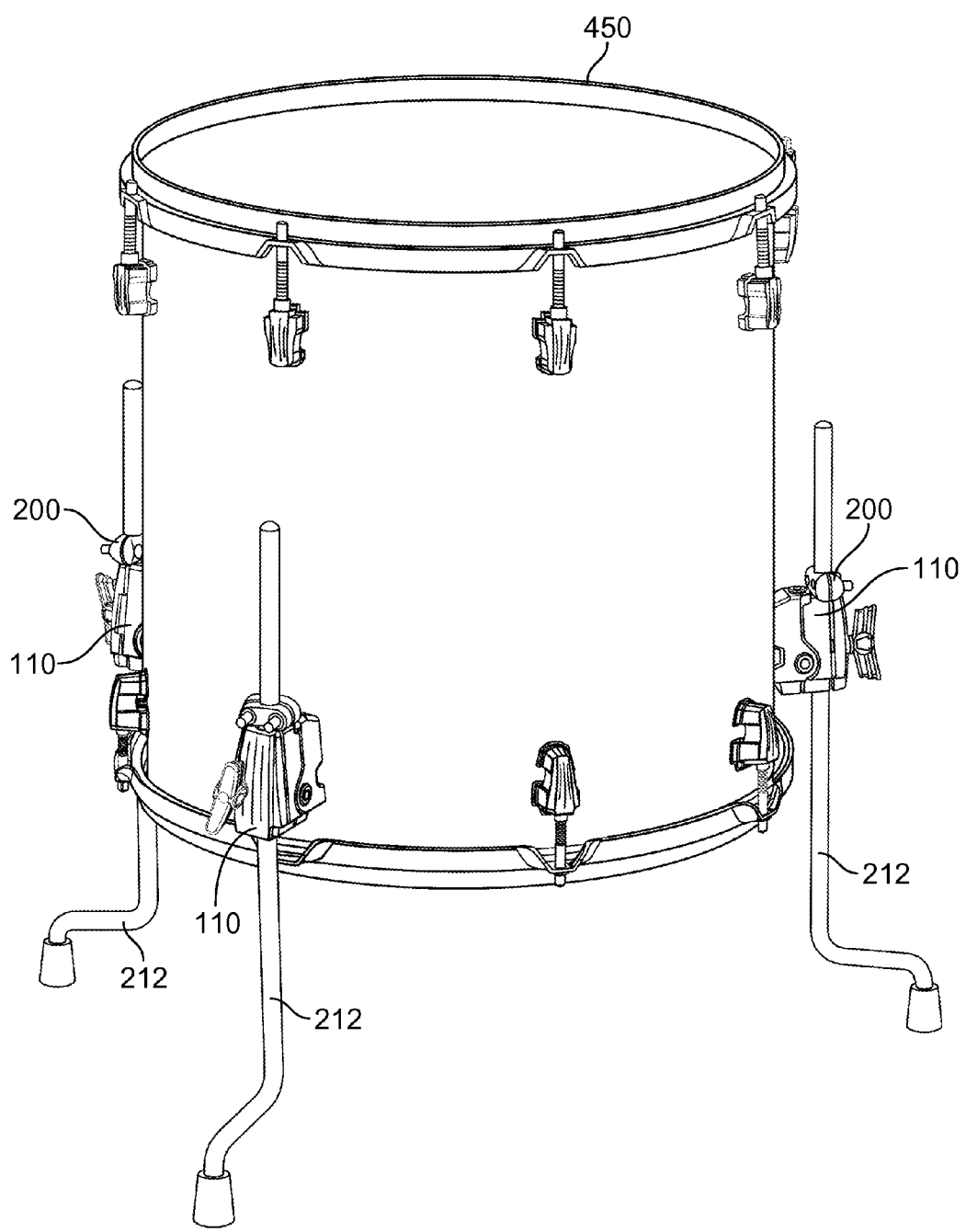

Referring to FIG. 12, a floor tom 450 can be supported by multiple (e.g., three) legs 212 that have a cross-sectional size and construction that are similar to the mounting rod 112. Each leg 212 is mounted to the floor tom 450 using a drum mounting clamp 110 mounted in place of a drum lug. Mounting locks 200 preserve the height and orientation of each of the legs 212 when the floor tom 450 is broken for storage or transportation.

Figure 13:
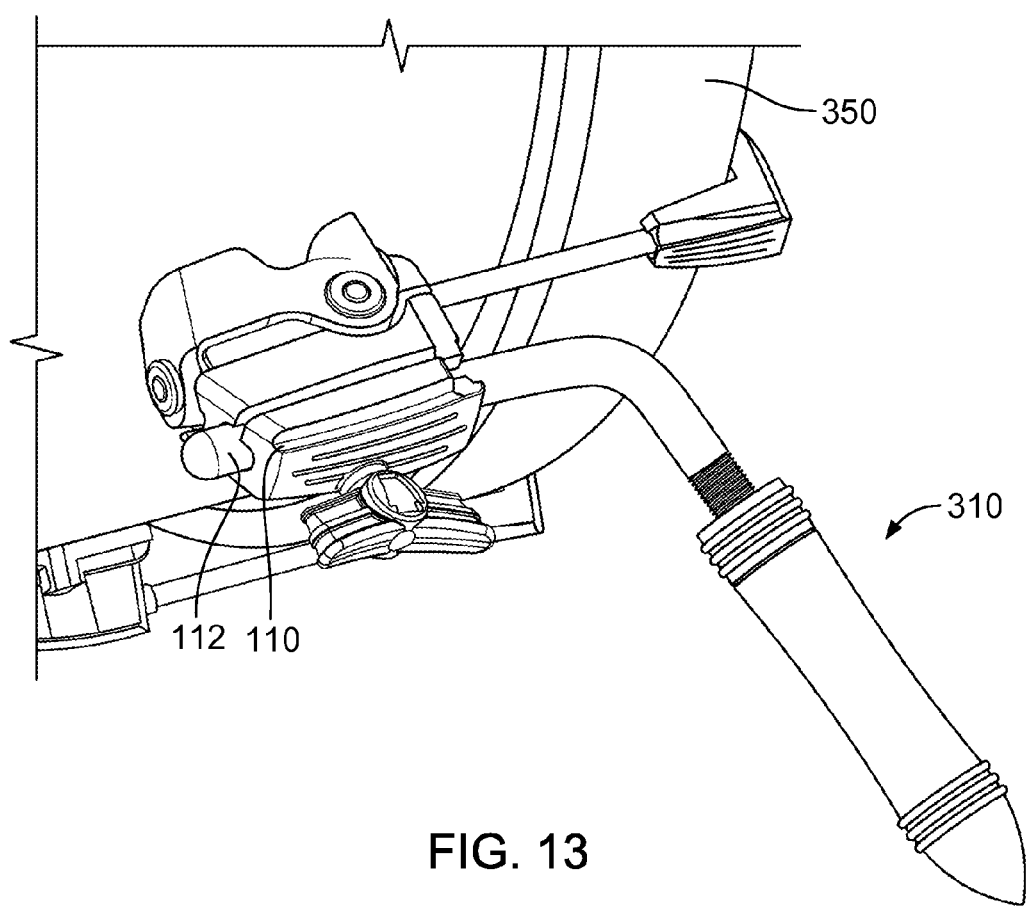
Figures 14, 15, 16:
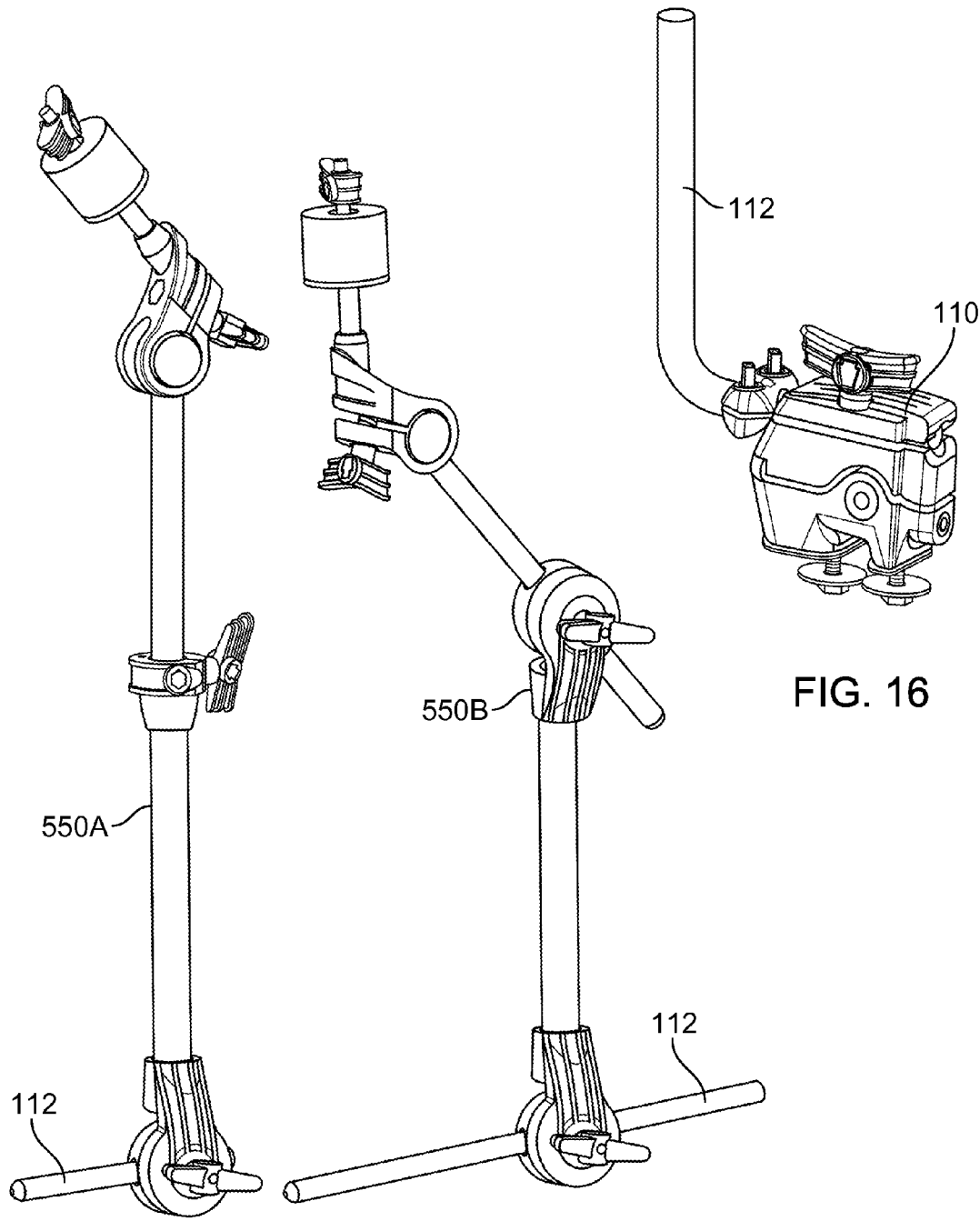
Figure 17:
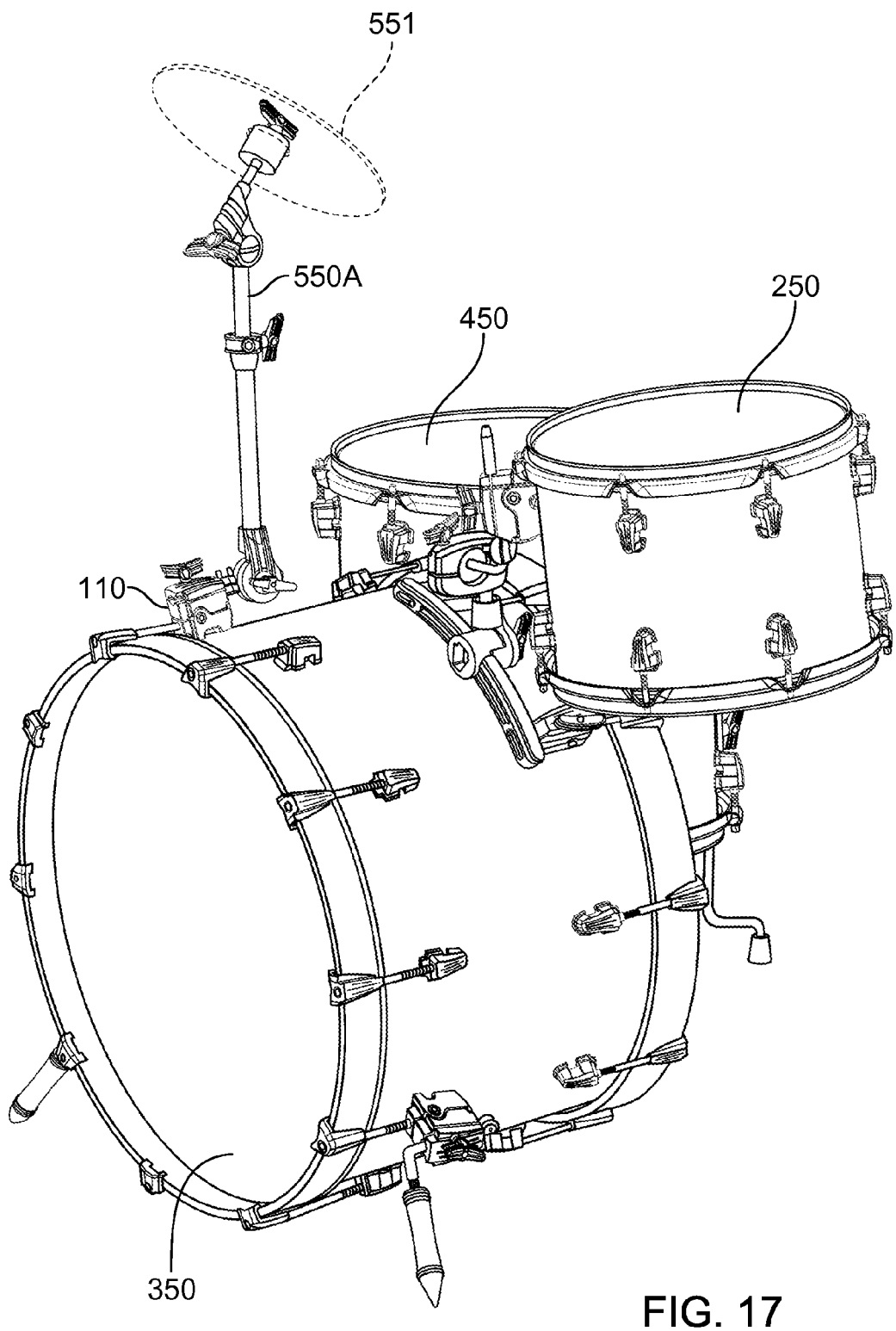

Referring to FIG. 13, a bass drum 350 can also be supported be foot elements 312 having a portion of mounting rod 112 to be grasped by a drum mounting clamp 110 mounted in place of a drum lug.

While the drum mounting clamp 110 has been described as being used for mounting different types of drums to a mounting rod 112 or to supporting legs or foot elements, other types of percussion equipment can be mounted using the drum clamp 110. For example, referring to FIGS. 14-17, a drum mounting clamp 110 can be mounted in place of a drum lug on a bass drum 350 for mounting cymbal stands 550A, 550B. As shown, the drum mounting clamp 110 can grasp a section of mounting rod 112 that is clamped to a cymbal stand 550A, 550B to arrange a cymbal 551 at a desired orientation relative to the bass drum 350 and the tom tom 250.

Figure 8:
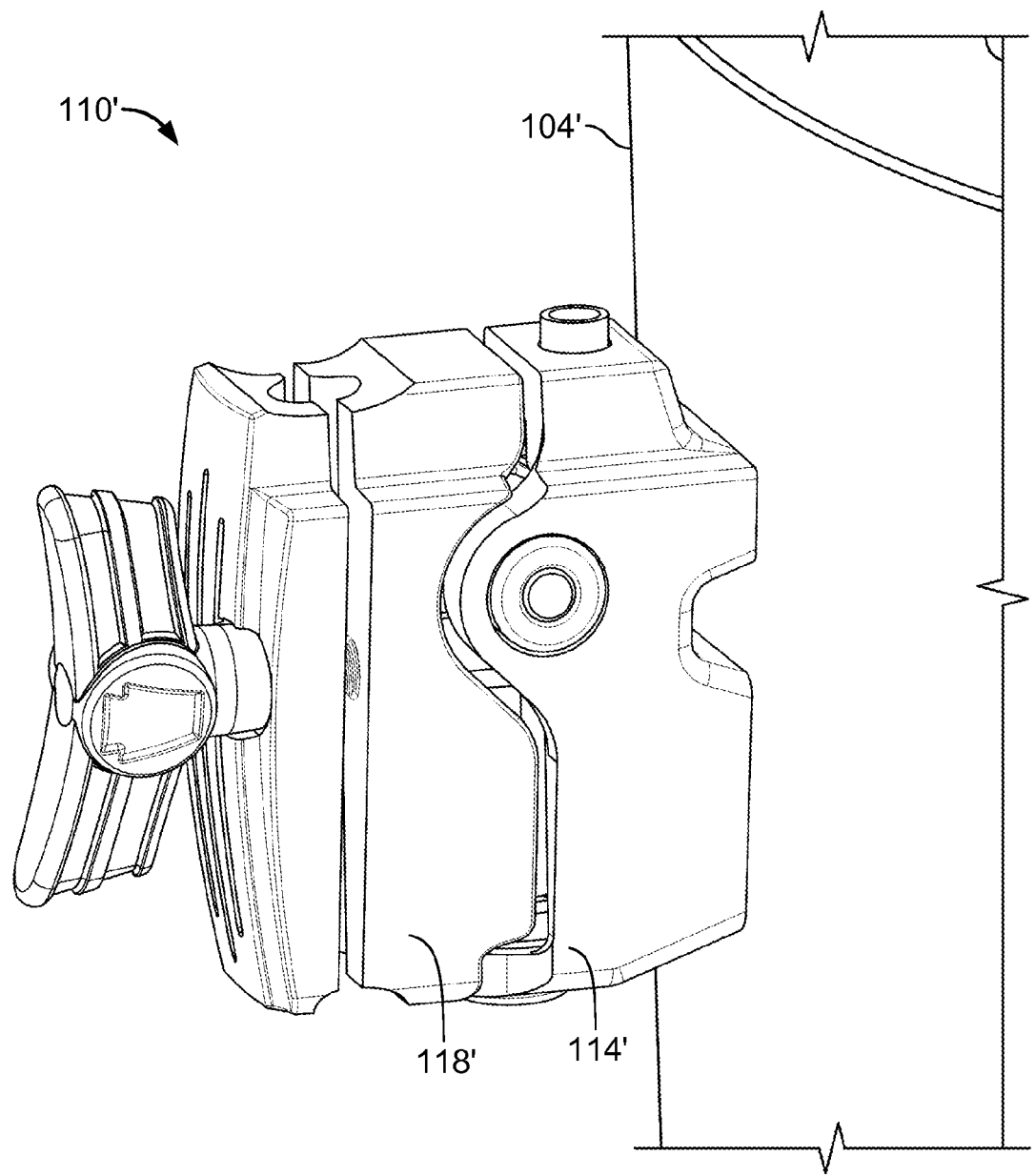
FIG. 8 is an enlarged perspective view of another implementation of a drum mounting clamp of this disclosure.
Figure 9:
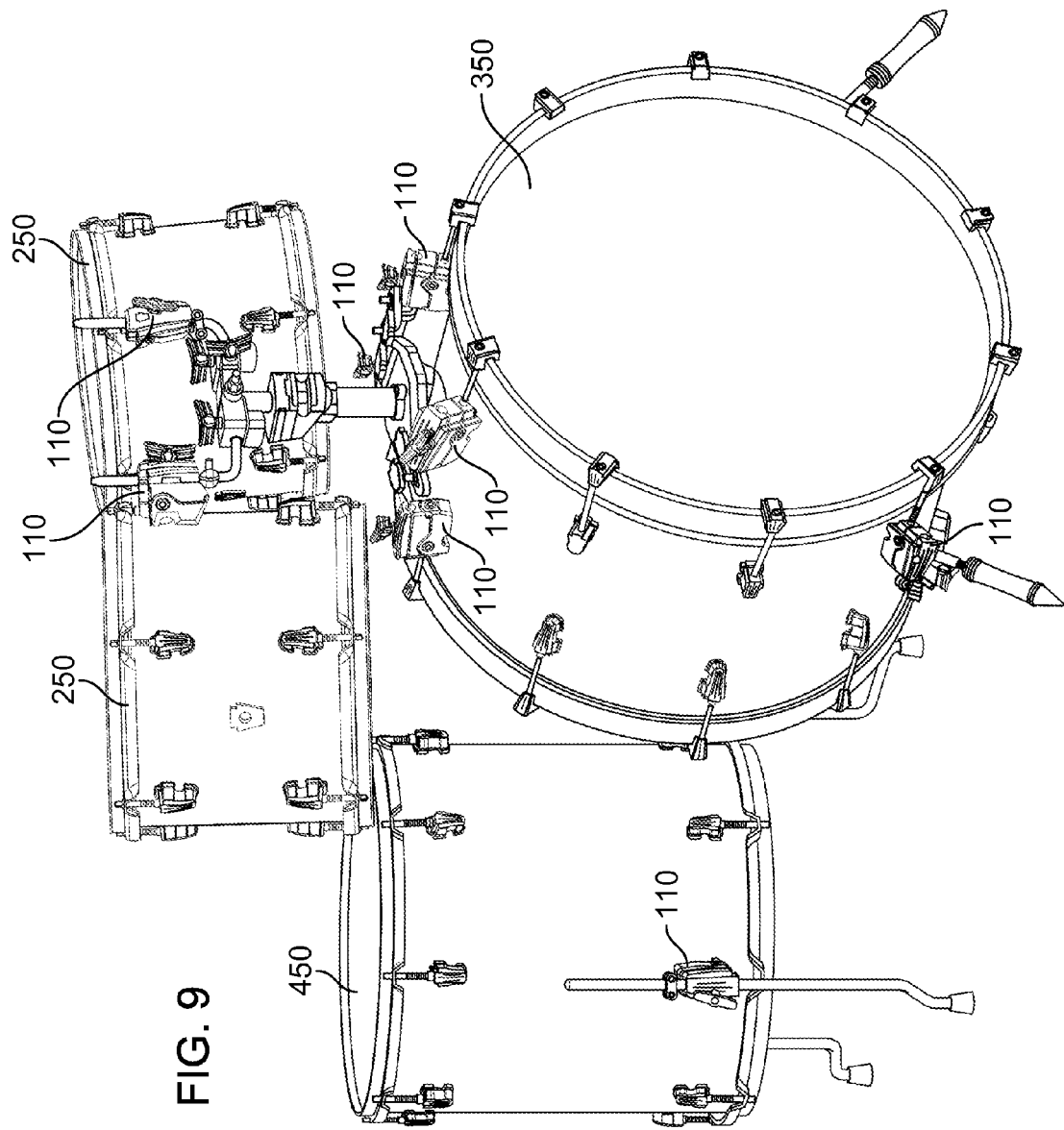
FIGS. 9-17 illustrate various exemplary uses of the drum mounting clamp of FIG. 1 or FIG. 8.

Also, referring to FIG. 8, in another implementation of the drum mounting clamp 110' of the disclosure, the mounting base 114' and the clamp base 118' are joined with little or an absence of vibration isolation from the drum body 104'.

What is claimed is:

1. A musical percussion instrument comprising:
    a musical drum comprising a generally cylindrical musical drum body and a sound generating surface secured to an upper end of the drum body by a plurality of drum lugs; and
    a drum mounting clamp mounted to one drum lug of said plurality of drum lugs for
    releasable mounting of a mounting rod to the drum body, said drum mounting clamp comprising:
        a mounting base mounted upon the drum body; and
        a mounting clamp mounted upon the mounting base, said mounting clamp comprising a clamp base and a clamp element, the clamp base and clamp element being reversibly adjustable between a first, spaced position for receiving the mounting rod and a second, clamping position for securely grasping the mounting rod.

2. The musical percussion instrument of claim 1, further comprising a vibration isolation member disposed generally between and joining the mounting base and the mounting clamp, and placing the mounting clamp in vibration isolation from the drum body.

3. The musical percussion instrument of claim 2, wherein the vibration isolating member comprises rubber.

4. The musical percussion instrument of claim 2, wherein:
    the mounting base defines a first pin member disposed in a first plane and engaged in the vibration isolation member, the first plane being generally horizontal relative to the musical drum axis; and
    the clamp base defines a second pin member disposed in a second plane lying generally perpendicular to the first plane and engaged in the vibration isolation member, the second plane being generally vertical relative to the musical drum axis.

5. The musical percussion instrument of claim 4, wherein the vibration isolation member comprises:
    a pair of first washer elements formed of a resilient, vibration dampening material received about the first pin member, and
    a second washer element formed of the resilient, vibration-dampening material received about the second pin member.

6. The musical percussion instrument of claim 5, wherein each of the washer elements of the first pair of washer elements is disposed in opposing first recesses defined by the mounting base, and the second washer element is disposed in a second recess defined by the mounting base.

7. The musical percussion instrument of claim 6, wherein the second washer element is disposed at a generally lower end of the drum clamp relative to the sound generating surface of the drum than the pair of first washer elements.

8. The musical percussion instrument of claim 6, wherein the first pin member extends through the first washer elements.

9. The musical percussion instrument of claim 8, further comprising securement elements securing the first and second pin members relative to the clamp base.

10. The musical percussion instrument of claim 9, wherein the securement elements comprise threaded fasteners.

11. The musical percussion instrument of claim 1, further comprising one or more mounting members securing the mounting base to the drum body in a drum lug position.

12. The musical percussion instrument of claim 11, wherein the mounting members are threaded fasteners engaged in a drum lug receptacle of the drum body.

13. The musical percussion instrument of claim 1, further comprising a memory locking device to be fastened to the mounting rod, the memory locking device defining an outer surface that is shaped and arranged to be received by a mating surface of the drum mounting clamp when the drum clamp and the memory locking device are secured to the mounting rod and abutted to one another.

14. A drum mounting clamp for releasable mounting of a mounting rod to a musical drum body in a position provided for mounting a drum lug, the drum mounting clamp comprising:
    a mounting base for mounting upon the musical drum body; and
    a mounting clamp mounted upon the mounting base, said mounting clamp comprising a clamp base and a clamp element, the clamp base and clamp element being reversibly adjustable between a first, spaced position for receiving the mounting rod and a second, clamping position for securely grasping the mounting rod; and
    wherein:
        the mounting base defines a first pin member disposed in a first plane and engaged in the vibration isolation member, and
        the clamp base defines a second pin member disposed in a second plane lying generally perpendicular to the first plane and engaged in the vibration isolation member; and
    wherein the drum clamp further comprises a vibration isolation member disposed generally between and joining the mounting base and the mounting clamp, and placing the mounting clamp in vibration isolation from the drum body.

15. The drum mounting clamp of claim 14, wherein the vibration isolating member comprises rubber.

16. The drum mounting clamp of claim 14, wherein the vibration isolation member comprises:
- a pair of first washer elements formed of a resilient, vibration dampening material received about the first pin member, and
- a second washer element formed of the resilient, vibration-dampening material received about the second pin member.

17. The drum mounting clamp of claim 16, wherein each of the washer elements of the first pair of washer elements is disposed in opposing first recesses defined by the mounting base, and the second washer element is disposed in a second recess defined by the mounting base.

18. The drum mounting clamp of claim 16, wherein the second washer element is disposed relatively closer to a first end of the drum clamp than the pair of first washer elements.

19. The drum mounting claim of claim 16, wherein the first pin member extends through the first washer elements.

20. The drum mounting clamp of claim 18, further comprising securement elements securing the first and second pin members relative to the clamp base.

21. The drum mounting clamp of claim 19, wherein the securement elements comprise threaded fasteners.

* * * * *

UNITED STATES PATENT AND TRADEMARK OFFICE
CERTIFICATE OF CORRECTION

PATENT NO. : 9,613,603 B2
APPLICATION NO. : 14/355092
DATED : April 4, 2017
INVENTOR(S) : Joshua Allen It is certified that error appears in the above-identified patent and that said Letters Patent is hereby corrected as shown below:

In the Claims

Column 9, Line 19, Claim 19, delete "claim of" and insert -- clamp of --, therefor.

Signed and Sealed this
Sixth Day of June, 2017

Michelle K. Lee
*Director of the United States Patent and Trademark Office*